Feb. 12, 1963 L. T. FLEMING ET AL 3,077,520

MAGNETIC PICKUP HEADS

Filed May 22, 1961

INVENTORS
LAWRENCE T. FLEMING
ROBERT K. WILLARDSON

BY Christie, Parker & Hale
ATTORNEYS

United States Patent Office 3,077,520
Patented Feb. 12, 1963

3,077,520
MAGNETIC PICKUP HEADS

Lawrence T. Fleming and Robert K. Willardson, Pasadena, Calif., assignors to Consolidated Electrodynamics Corporation, Pasadena, Calif., a corporation of California Filed May 22, 1961, Ser. No. 111,540
8 Claims. (Cl. 179—100.2)

This invention relates to improvements in magnetic pickup heads using the "Hall" effect.

Hall-type magnetic heads have been described in the literature, e.g. "Elektroniche Rundschau," No. 11/59, pp. 407–408. These heads use a core or yoke of soft magnetic metal to pick up magnetic signals from a magnetic recording medium, such as tape. A Hall element is disposed in the flux developed in the yoke to produce output voltages proportional to the magnetic signals appearing on the tape. Such pickup heads have numerous advantages, such as an output voltage independent of signal frequency. However, the output of Hall-type heads available prior to this invention are affected by stray magnetic fields, and the heads often must be magnetically shielded to achieve a desired signal-to-noise ratio.

This invention provides a hum-bucking construction for magnetic heads of the Hall type to reduce or eliminate the effect of stray external magnetic fields on the output voltage developed by the head, and thereby avoid the need of magnetic shielding.

Briefly, this invention contemplates a magnetic head for use in an external magnetic field. The head includes a yoke or core of magnetic material which has a gap adapted to be disposed adjacent a magnetic recording medium on which a magnetic signal is recorded. Means are provided for producing a signal-dependent magnetic flux in the yoke. A pair of Hall elements are disposed in the signal dependent magnetic flux. Each of the Hall elements has respective contacts which are connected together to produce additive output signals in response to the signal-dependent magnetic flux in the yoke, and cancelling output signals generated by the external magnetic field.

In the preferred form of the invention, the yoke includes an additional pair of gaps disposed so that the flux in the yoke crosses the gaps in opposite directions. A separate respective Hall element is disposed in each of the gaps, which preferably are parallel to each other and lie in a common plane. A magnetic shunt is disposed across one of the gaps in the pair, and means are provided for adjusting its shunting effect for maximum hum cancellation.

Figure 1:
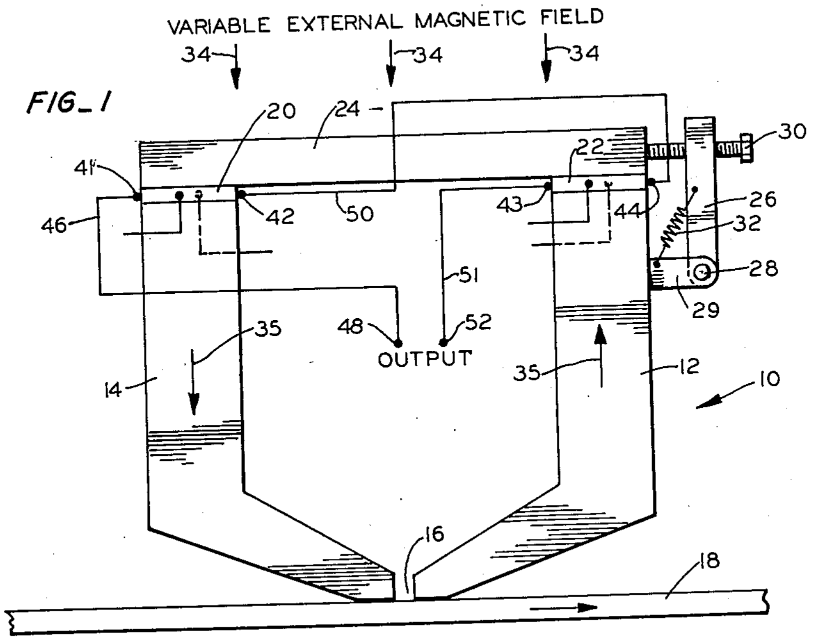
Figure 2:
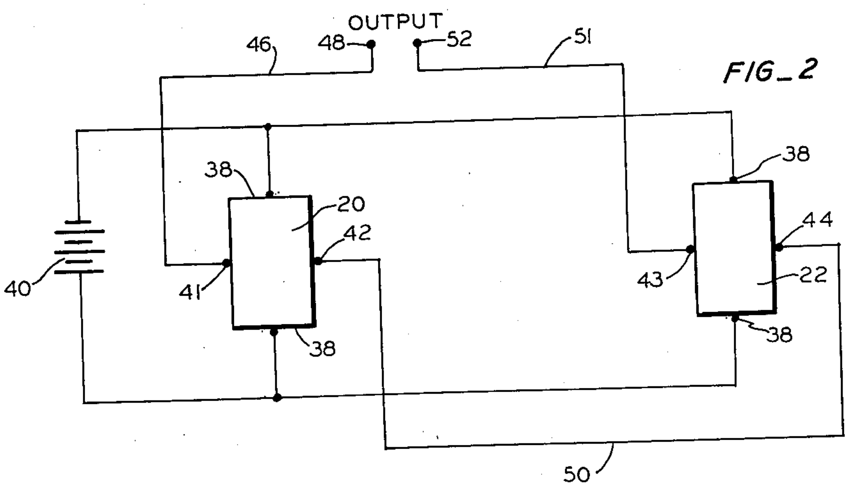

These and other aspects of the invention will be more fully understood from the following detailed description and the accompanying drawing in which:

FIG. 1 is a schematic elevation of the presently preferred embodiment of the invention; and FIG. 2 is a schematic diagram of the circuit used with apparatus shown in FIG. 1.

Referring to the drawing, a yoke 10 of soft magnetic material is made of two L-shaped opposed right and left pole pieces 12 and 14, respectively, disposed to form a small signal gap 16 adjacent a magnetic tape 18. Separate respective right and left Hall elements 20 and 22 are mounted, say cemented, on the upper end of each pole piece. A horizontal transverse bar 24 of soft magnetic material is cemented at each end to the top surfaces of the Hall elements to complete the magnetic circuit of the yoke, and provide a pair of parallel gaps in a common flat plane and in the magnetic circuit in which the Hall elements are mounted. An upright magnetic shunt piece 26 is secured at its lower end by horizontal pivot pin 28 to a bracket 29 on the outside and upper portion of the right pole piece. A transverse adjusting screw 30 is threaded through the upper portion of the shunt 26 to bear against the right end of the transverse bar 24. A tension spring 32 is connected at its opposite ends to the shunt piece 26 and bracket 29 to urge the adjusting screw 30 against the right end of the transverse bar 26. The adjusting screw is rotated to provide the correct spacing between the shunt and the yoke to achieve the desired shunting for maximum hum cancellation as described in detail below.

The magnetic head and tape are subjected to an external magnetic field indicated by arrows 34. Such a field may be produced under various circumstances, say due to the presence of 60-cycle current in apparatus with which the magnetic head is associated. As the tape 18 is moved past the signal gap 16, a signal-induced magnetic flux is developed in the yoke as indicated by the arrows 35 in FIG. 1. It should be noted that the signal-induced flux crosses the Hall elements in opposite directions, and the external field crosses the elements in the same direction.

FIG. 2 shows how the right and left Hall elements are connected to produce output signals proportional to signals on the tape and virtually insensitive to the presence of the external magnetic field. Each Hall element has input electrodes 38 which are connected across a suitable source 40 of stable D.C. current, say a storage battery. The left Hall element has first and second output contacts 41, 42, rsepectively, and the second Hall element has first and second output contacts 43 and 44, respectively. A first lead 46 connects the first contact 41 of the left element to an output terminal 48 of the head. A second lead 50 connects the second output contact 42 of the left element to the second contact 44 of the right element. A third lead 51 connects the first contact 43 of the second element to an output terminal 52.

The outputs of the Hall elements are connected to produce additive output signals in response to the signal-dependent magnetic flux in the yoke, and to produce cancelling signals in response to the external magnetic field. This result is obtained because the elements are disposed in gaps of the magnetic circuit of the yoke so that the signal-dependent magnetic flux crosses the Hall elements in opposite directions, and the external magnetic field crosses the elements in the same direction.

As the magnetic tape 18 is moved past the first gap 16, a magnetic field is developed in the yoke in accordance with the signal on the tape. The magnetic flux in the yoke is converted to output voltage by the Hall elements. Any output signals developed by each of the Hall elements in response to stray, e.g., 60-cycle, magnetic fields is bucked out. The adjusting screw 30 is set to provide the proper spacing for the magnetic shunt 26 to balance the outputs of the two Hall elements for maximum hum cancellation.

Thus, this invention provides a magnetic head with all of the advantages of the Hall type, plus a hum-bucking arrangement to cancel the effect of stray magnetic fields and avoid the necessity for elaborate shielding of the head from external magnetic fields.

We claim:

1. A magnetic head for use in an external magnetic field, the head comprising a yoke of magnetic material, the yoke having a gap adapted to be disposed adjacent a magnetic recording medium on which a magnetic signal is recorded, means for producing a signal-dependent magnetic flux in the yoke, a pair of Hall elements disposed in the signal-dependent magnetic flux, each of the Hall elements having respective output contacts, and means connecting the output contacts to produce additive output signals in response to the signal-dependent magnetic flux in the yoke, and to produce cancelling signals in response to the external magnetic field.

2. A magnetic head for use in an external magnetic field, the head comprising a yoke of magnetic material, the yoke having a first gap adapted to be disposed adjacent a magnetic recording medium on which a magnetic signal is recorded, means for producing a signal-dependent magnetic flux in the yoke, the yoke having second and third gaps, a separate respective Hall element disposed in each of the second and third gaps in the signal-dependent magnetic flux, each of the Hall elements having respective output contacts, and means connecting the output contacts to produce additive output signals in response to the signal-dependent magnetic flux in the yoke, and to produce cancelling signals in response to the external magnetic field.

3. Apparatus according to claim 2 which includes a magnetic shunt disposed across at least one of the gaps in which a Hall element is disposed.

4. Apparatus according to claim 3 which includes means for adjusting the effect of the magnetic shunt.

5. A magnetic head for use in an external magnetic field, the head comprising a yoke of magnetic material, the yoke having a first gap adapted to be disposed adjacent a magnetic recording medium on which a magnetic signal is recorded, means for producing a signal-dependent magnetic flux in the yoke, the yoke having thin second and third gaps transverse to the signal-dependent flux in the yoke, a separate respective Hall element in the form of a thin plate disposed in the signal-dependent magnetic flux, each of the Hall elements having respective output contacts and respective input contacts, a source of substantially constant current, means connecting the current source to the input contacts, and means connecting the output contacts to produce additive output signals in response to the signal-dependent magnetic flux in the yoke and to produce cancelling signals in response to the external magnetic field.

6. A magnetic head for use in an external magnetic field, the head comprising a yoke of magnetic material, the yoke having a first gap adapted to be disposed adjacent a magnetic recording medium on which a magnetic signal is recorded, means for producing a signal-dependent magnetic flux in the yoke, the yoke having thin second and third gaps transverse to the signal-dependent flux in the yoke, a separate respective Hall element in the form of a thin plate disposed in the signal-dependent magnetic flux, the plates being parallel to each other, each of the Hall elements having respective output contacts and respective input contacts, a source of substantially constant current, means connecting the current source to the input contacts, and means connecting the output contacts to produce additive output signals in response to the signal-dependent magnetic flux in the yoke, and to produce cancelling signals in response to the external magnetic field.

7. Apparatus according to claim 6 in which the parallel plates lie in a common plane.

8. A magnetic head for use in an external magnetic field, the head comprising a yoke of magnetic material, the yoke having a first gap adapted to be disposed adjacent a magnetic recording medium on which a magnetic signal is recorded, means for producing a signal-dependent magnetic flux in the yoke, the yoke having thin second and third gaps transverse to the signal-dependent flux in the yoke and disposed to be traversed in opposite directions by the signal-dependent flux in the yoke, a separate respective Hall element in the form of a thin plate disposed in the signal-dependent magnetic flux, each of the Hall elements having respective output contacts and respective input contacts, a source of substantially constant current, means connecting the current source to the input contacts, and means connecting the output contacts to produce additive output signals in response to the signal dependent magnetic flux in the yoke, and to produce cancelling signals in response to the external magnetic field.

No references cited.